United States Patent
Jones et al.

(10) Patent No.: US 7,882,281 B2
(45) Date of Patent: Feb. 1, 2011

(54) SAS REFERENCE PHYS FOR VIRTUALIZATION AND TRAFFIC ISOLATION

(75) Inventors: Marc Timothy Jones, Costa Mesa, CA (US); Ernest John Frey, Costa Mesa, CA (US)

(73) Assignee: Emulex Design & Manufacturing Corporation, Costa Mesa, CA (US)

( * ) Notice: Subject to any disclaimer, the term of this patent is extended or adjusted under 35 U.S.C. 154(b) by 0 days.

(21) Appl. No.: 11/953,805

(22) Filed: Dec. 10, 2007

(65) Prior Publication Data

US 2009/0150643 A1    Jun. 11, 2009

(51) Int. Cl.
G06F 3/00 (2006.01)
G06F 5/00 (2006.01)
G06F 13/00 (2006.01)
G06F 9/26 (2006.01)
G06F 9/34 (2006.01)

(52) U.S. Cl. .................. 710/36; 710/62; 710/107; 711/200

(58) Field of Classification Search ........... 710/62, 710/36, 107; 711/200
See application file for complete search history.

(56) References Cited

U.S. PATENT DOCUMENTS

| | | | |
|---|---|---|---|
| 7,668,925 B1* | 2/2010 | Liao et al. .................... | 709/212 |
| 2005/0080881 A1* | 4/2005 | Voorhees et al. ............ | 709/220 |
| 2005/0125574 A1* | 6/2005 | Foster et al. .................. | 710/36 |
| 2006/0101171 A1* | 5/2006 | Grieff et al. .................. | 710/36 |
| 2007/0165660 A1* | 7/2007 | Fang et al. ................... | 370/410 |

* cited by examiner

*Primary Examiner*—Alford W Kindred
*Assistant Examiner*—Farley J Abad
(74) *Attorney, Agent, or Firm*—Morrison & Foerster LLP

(57) ABSTRACT

Enabling virtualization in a SAS expander is disclosed. For each SAS address to be virtualized through one or more physical or virtual Phy, a reference Phy associated with each SAS address is created within the expander. Next, a route table is generated that includes an entry for each of the SAS addresses being virtualized, each entry associated with one or more of the physical or virtual Phy through which the SAS address is being virtualized. With the route table so established, requests for a virtualized SAS address are routed to a particular one of the one or more physical or virtual Phy associated with the virtualized SAS address in the route table.

31 Claims, 9 Drawing Sheets

SAS REFERENCE PHYS FOR VIRTUALIZATION AND TRAFFIC ISOLATION

FIELD OF THE INVENTION

This invention relates to Serial Attached Small Computer System Interface (SAS) expanders, and more particularly to providing virtualization capabilities in SAS expanders.

BACKGROUND OF THE INVENTION

N_Port ID Virtualization (NPIV) is a feature of Fibre Channel that provides the ability to report more than one entity (address) behind a lesser number of addresses.

However, the SAS protocol, including the new SAS-2 protocol, the specification of which is currently available in draft form (Revision 12, Sep. 28, 2007) at www dot t10 dot org and identified as T10/1760-D or Reference Number ISO/IEC 14776-152:200x, the contents of which are incorporated by reference herein, does not provide NPIV functionality, because SAS defines a Phy as representing a single SAS address. In other words, every end-device (represented by a Phy) has one and only one SAS address attached. Thus, a device attached to the Phy cannot differentiate more than one source or destination.

A SAS expander can generally be described as a switch that allows initiators and targets to communicate with each other in a network, and allows additional initiators and targets to be added to the network. There is a need to provide NPIV-like functionality within a SAS expander.

SUMMARY OF THE INVENTION

Embodiments of the invention are directed to enabling virtualization in a SAS expander. For each SAS address to be virtualized through one or more physical or virtual Phy, a reference Phy associated with each SAS address is created within the expander. Next, a route table is generated that includes an entry for each of the SAS addresses being virtualized, each entry associated with one or more of the physical or virtual Phy through which the SAS address is being virtualized. With the route table so established, requests for a virtualized SAS address are routed to a particular one of the one or more physical or virtual Phy associated with the virtualized SAS address in the route table.

The SAS address space of an expander can therefore be increased while maintaining a constant physical Phy count. Expander virtualization makes target virtualization possible and initiator virtualization simpler, and can result in significant savings in the number of gates needed for implementation. The virtual Phy count through reference Phys can also be increased (allowing multiple SES targets over a single SES Phy), thus reducing the cost. The applications of this technique include I/O virtualization, and increasing the address-space of an expander's SES ports without needing additional virtual phys (for SES traffic isolation that can support multiple SES targets).

A reference Phy includes no link layers or Serdes, and only uses a route table index. A reference Phy is a virtual entity created by firmware executed in a processor in the expander, and appears to be an actual Phy for the purpose of referring a request to either a physical Phy or a virtual Phy. However, a reference Phy has no physical component, and only exploits a feature of the route table to refer traffic directed to it to a virtual or physical Phy. A reference Phy allows the SAS domain to access a device having a particular SAS address by redirecting commands with a destination of that SAS address to either a virtual Phy or a physical Phy (depending on which Phy the device having the particular SAS address is connected to) using route table indirection. In other words, a reference Phy creates an indirection (via a different SAS address) to arrive at a specific endpoint, which can be either a physical or virtual Phy. A reference Phy has its own SAS address, but has no physical embodiment, and in the route table refers to another Phy in the expander.

According to some embodiments of the invention, a target controller can send a series of CONFIG_PHY_INFO commands using the SAS Management Protocol (SMP) to a SAS expander, one for each device connected to the target controller. This command indicates the referring address (to which Phy to refer the request), provides its address (of the reference Phy), and requests that the expander represent that device. Because the expander knows the physical Phys through which the commands are being received, the firmware in the expander creates reference Phys, one for each device, each reference Phy associated with one or more of the physical Phys through which the commands are being received.

In other embodiments in which the devices attached to the SAS expander are known and stable, the information needed to create the reference Phys can be stored as part of the initial configuration information in nonvolatile memory such as flash, and loaded upon startup so that the firmware in the expander can create the reference Phys automatically without the need to receive commands from the target controller. In still further embodiments, after the target controller causes reference Phy configuration information to be generated and the references Phys are created, the target controller can request that the reference Phy configuration information be stored in persistent memory or storage so that it thereafter reappears automatically upon boot. After a reference Phy is created, a broadcast change notification (BCN) is emitted to notify external initiators of the change.

These reference Phys now appear to the SAS network as regular Phys, and can be discovered during initiator discovery and expander self-configuration. To the initiators and expander, it appears that the expander has additional physical Phys, when in fact they are just reference Phys. Accordingly, a route table is created by the expander, with additional entries for the device addresses, each address associated with one or more of the physical Phys.

By referring commands to either a physical Phy or a virtual Phy depending on the destination address of the command, the reference Phy enables a larger number of targets to be accessed through a lesser number of physical or virtual Phy. For example, if an initiator sends an OPEN frame (a command to request the opening of a connection) to a SAS expander with a source address of the initiator and a particular destination address in an attempt to open up a connection with the device associated with that destination address, the expander will receive the request, use the route table to determine that the device is accessible through one or more physical Phy, determine which physical Phy is available, and forward the OPEN request to the available physical Phy. The target controller receives the OPEN frame, determines the destination address of the request, and forwards the request to the device associated with that address.

Reference Phys may also be created by a SAS expander coupled to a server to provide initiator virtualization from a platform perspective. This would be a likely scenario in virtualization environments where multiple host-operating systems share an IOC. By referring requests to either a physical Phy or a virtual Phy depending on the destination address of the request, the reference Phy enables a larger number of virtual initiators to be accessed through a lesser number of physical or virtual Phy. For example, if a target sends an OPEN frame to a SAS expander with a particular destination address in an attempt to open up a connection with a particular virtual initiator, the expander will receive the request, use the route table to determine that the particular virtual initiator is accessible through a particular physical Phy, determine which Phy is available, and forward the request to the available physical Phy. The SAS controller receives the OPEN frame, determines the destination address of the command, and forward the command to the virtual initiator associated with that address.

Reference Phys may also be created to enable multiple SCSI Enclosure Services (SES) applications to exist behind a single virtual Phy. SES applications are accessible through a virtual Phy, run within the expander, and control environmental aspects of the expander, such as turning a fan on or off. SES applications may also be capable of sending data about environmental conditions in the form of SCSI mode pages back to a requesting device such as an initiator. Reference Phys can be created and added to a routing table, so that commands such as OPEN frames from the expander connection manager (ECM) directed to the SES applications are referred to the virtual Phy through the reference Phys.

DETAILED DESCRIPTION OF THE PREFERRED EMBODIMENT

In the following description of preferred embodiments, reference is made to the accompanying drawings which form a part hereof, and in which it is shown by way of illustration specific embodiments in which the invention may be practiced. It is to be understood that other embodiments may be utilized and structural changes may be made without departing from the scope of the preferred embodiments of the present invention.

Embodiments of the invention are directed to enabling virtualization in a SAS expander. For each SAS address to be virtualized through one or more physical or virtual Phy, a reference Phy associated with each SAS address is created within the expander. Next, a route table is generated that includes an entry for each of the SAS addresses being virtualized, each entry associated with one or more of the physical or virtual Phy through which the SAS address is being virtualized. With the route table so established, requests for a virtualized SAS address are routed to a particular one of the one or more physical or virtual Phy associated with the virtualized SAS address in the route table.

The SAS address space of an expander can therefore be increased while maintaining a constant physical Phy count. Expander virtualization makes target virtualization possible and initiator virtualization simpler, and can result in significant savings in the number of gates needed for implementation. The virtual Phy count through reference Phys can also be increased (allowing multiple SES targets over a single SES Phy), thus reducing the cost. The applications of this technique include I/O virtualization, and increasing the address-space of an expander's SES ports without needing additional virtual phys (for SES traffic isolation that can support multiple SES targets).

Although embodiments of the invention may be described herein in the context of SAS ports and attached SAS devices, it should be understood that embodiments of the invention are not so limited, but extend to other protocols and devices that include, but are not limited to, Serial Advanced Technology Attachment (SATA) devices, which can connect to SAS expanders through a special port known as a SATA Tunneling Protocol (STP) port.

Figure 1A:
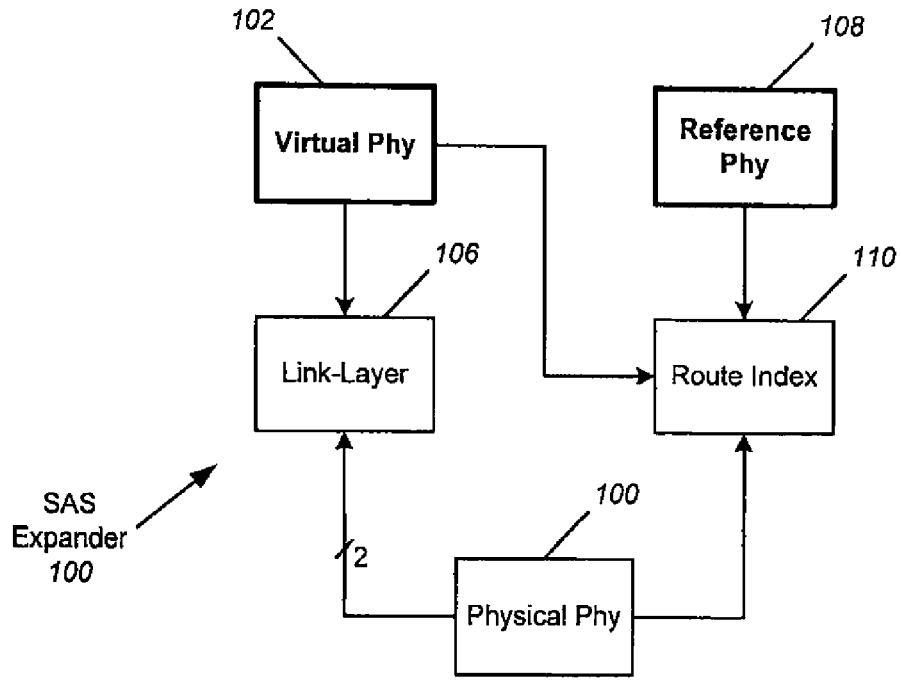
FIG. 1a illustrates an exemplary physical Phy, virtual Phy, and reference Phy within a SAS expander for providing NPIV-like capabilities according to embodiments of the invention.

FIG. 1a illustrates an exemplary physical Phy 100 and virtual Phy 102 within a SAS expander 104. Physical Phy 100 includes or is associated with one or two link layers (represented as a single block 106). Note that two connections are shown because the physical Phy can be multiplexed to communicate with either of the two link layers. Each link layer includes hardware for various data handling operations. A physical Phy also includes a serializer/deserializer (Serdes) (not shown in FIG. 1) for connecting external attached devices to the expander. Virtual Phy 102 is associated with only one link layer 106 (and no Serdes) and is used for representing a processor within the expander and enabling the processor to connect to the routing logic within the expander. A virtual Phy attaches directly to the switch complex and exists solely as a way to attach a processor to the switch for the purposes of SES or SMP applications (a soft Phy).

FIG. 1a also illustrates an exemplary reference Phy 108 for providing NPIV-like capabilities according to embodiments of the invention. Reference Phy 108 includes no link layers or Serdes, and only uses a route table index. A reference Phy 108 is a virtual entity created by firmware executed in a processor in the expander. A reference Phy 108 appears to be an actual Phy for the purpose of referring a command to either a physical Phy or a virtual Phy. A reference Phy has no physical component, and only exploits a feature of the route table to refer traffic directed to it to a virtual or physical Phy. Note that physical Phy 100, virtual Phy 102, and reference Phy 108 all are associated with and communicate with a route index or table 110, which is used by the expander to find devices represented by certain SAS addresses and properly route requests. In other words, the route index is used to establish a connection with a particular SAS address at a physical or virtual Phy.

Figure 1B:
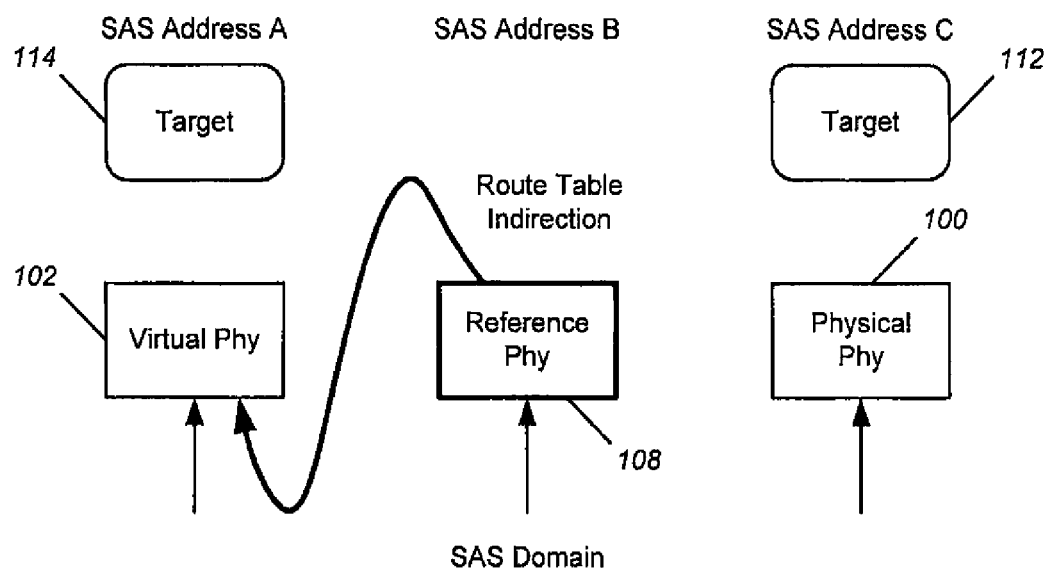
FIG. 1b illustrates the ability of a reference Phy to refer to either a physical Phy or a virtual Phy according to embodiments of the invention.

FIG. 1b illustrates the ability of a reference Phy 108 to refer to either a physical Phy 100 or a virtual Phy 102 according to embodiments of the invention. In the example of FIG. 1b, physical Phy 100 represents a target 112 having SAS address C and allows the SAS domain to access an external attached device such as target 112 having SAS address C. Similarly, virtual Phy 102 represents a target 114 having SAS address A and allows the SAS domain to access an internal target 114 (e.g. a processor) having SAS address A. Reference Phy 108 allows the SAS domain to access a device having SAS address B by redirecting commands with a destination of SAS address B to either the virtual Phy 102 or the physical Phy 100 (depending on which Phy the device having SAS address B is connected to) using route table indirection. Reference Phy 108 creates an indirection (via a different SAS address) to arrive at a specific endpoint, which can be either a physical or virtual Phy. Reference Phy 108 has its own SAS address, but has no physical embodiment, and in the route table refers to another Phy in the expander. A reference Phy can refer to either a virtual or physical Phy, but not another reference Phy.

Figure 1C:
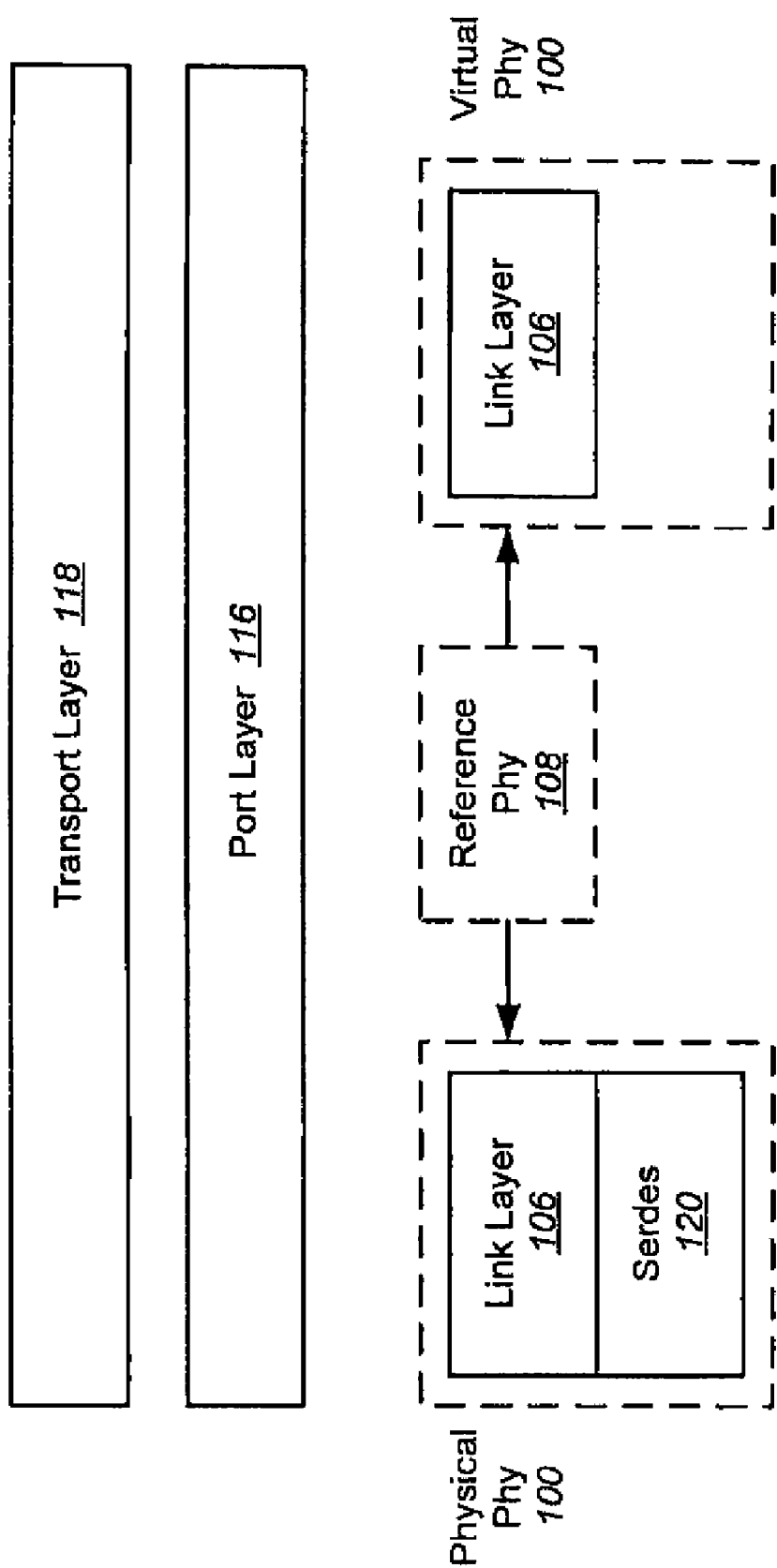
FIG. 1c illustrates another exemplary representation of the layer stack within a SAS expander according to embodiments of the invention.

FIG. 1c illustrates another exemplary representation of the layer stack within a SAS expander according to embodiments of the invention. In FIG. 1c, physical Phy 100 includes link layer 106 and Serdes 120 for providing an external connection for the SAS expander. Serdes 120 may have a serial analog connection on one end (the interface to the external world) and a parallel digital connection on the other end (the interface to the switch complex). Virtual Phy 102 includes link layer 106. Reference Phy 108 refers to either physical Phy 100 or virtual Phy 102. Link layers 106 in both the physical Phy 100 and virtual Phy 102 interface with a higher level port layer 116, which is an abstraction that helps identify which link layers are going to be passed up to the transport layer 118.

Figure 2A:
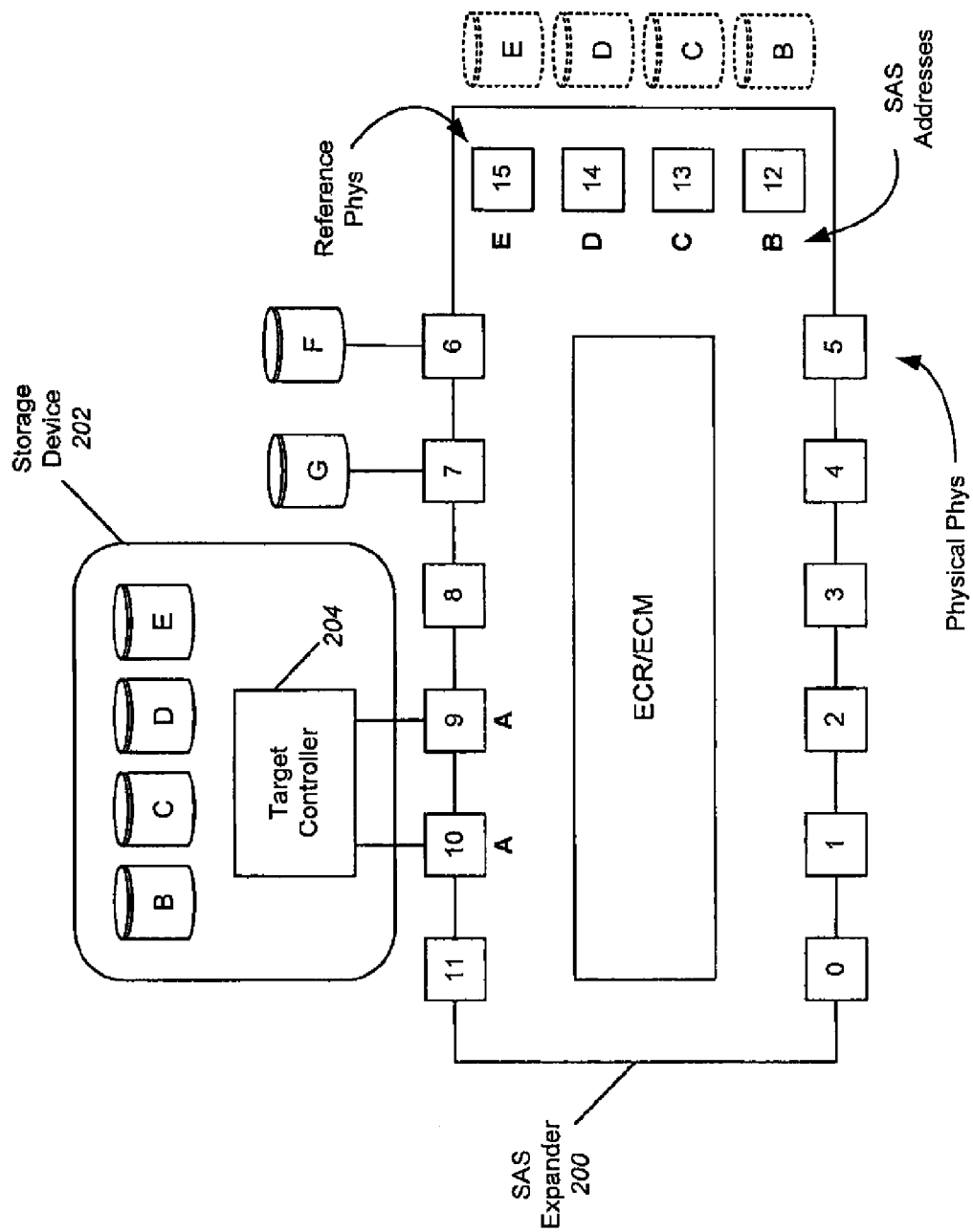
FIG. 2a illustrates an exemplary SAS expander in communication with four SAS devices having addresses B, C, D and E through only two physical Phy according to embodiments of the invention.

FIG. 2a illustrates an exemplary SAS expander 200 in communication with four SAS devices having addresses B, C, D and E through only two physical Phy 9 and 10 according to embodiments of the invention. FIG. 2a represents a common situation of representing multiple targets behind a single target controller. In FIG. 2a, SAS expander 200 is coupled to a storage device 202 having a target controller 204 and four drives having SAS addresses B, C, D and E through Phy 9 and 10. Phys 9 and 10 together comprise a wide port. In this wide port configuration, both Phys 9 and 10 are associated with the same SAS address A (per the definition in SAS where a wide-port is constructed of phys all having the same address). In addition, a device having a SAS address G is directly attached to physical Phy 7, and a device having a SAS address F is directly attached to physical Phy 6.

Figure 2B:
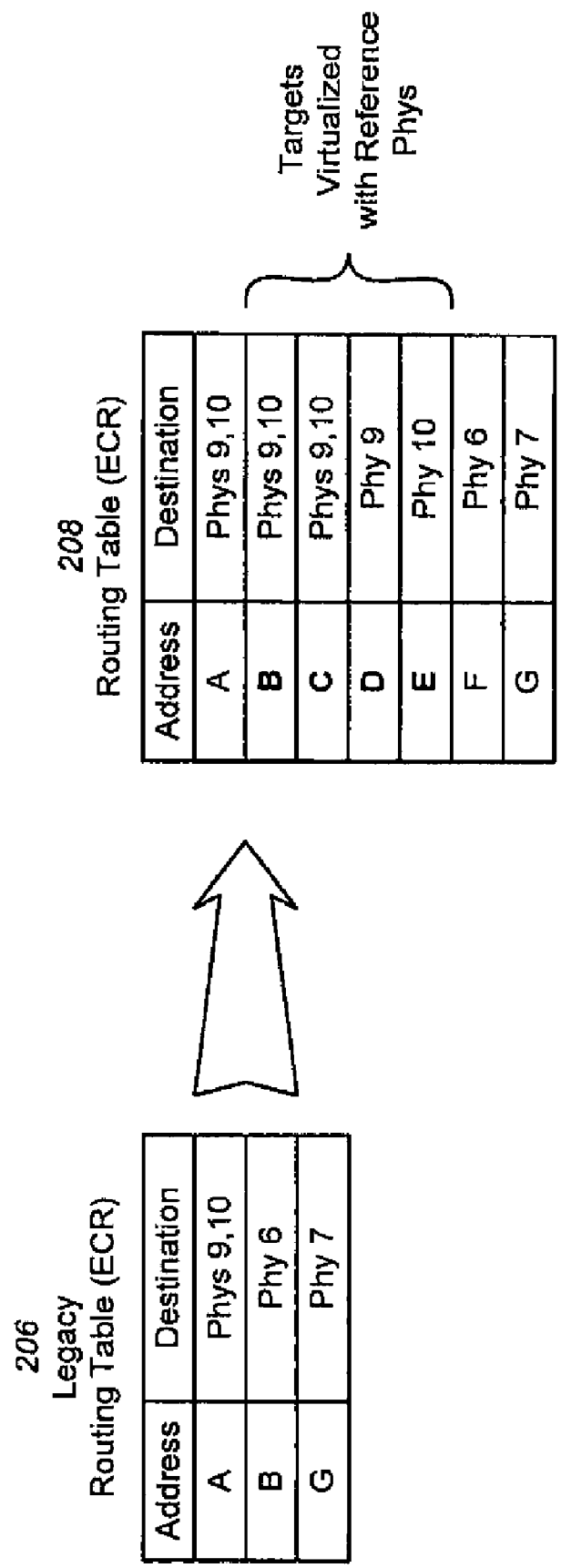
FIG. 2b illustrates exemplary route tables corresponding to the SAS expander of FIG. 2a according to embodiments of the invention.

FIG. 2b illustrates exemplary route tables corresponding to the SAS expander 200 of FIG. 2a according to embodiments of the invention. In FIG. 2b, with the initial configuration described above, a legacy routing table 206 can be created, with address A associated with Phys 9 and 10, address F associated with Phy 6, and address G associated with Phy 7.

However, according to some embodiments of the invention, target controller 204 can send a series of CONFIG_PHY_INFO commands using the SAS Management Protocol (SMP) to the SAS expander 200, one for each device B-E connected to the target controller. This command indicates the referring address (to which Phy to refer the request), provides its address (of the reference Phy), and requests that the expander represent that device. Because the expander 200 knows the Phy through which the commands are being received (Phy 9 and 10 in the example of FIG. 2), the firmware in the expander creates reference Phys 12-15, one for each device having addresses B-E, each reference Phy associated with Phy 9 and 10. In other embodiments in which the devices attached to the SAS expander are known and stable, the information needed to create the reference Phys can be stored as part of the initial configuration information in nonvolatile memory such as flash, and loaded upon startup so that the firmware in the expander can create the reference Phys automatically without the need to receive commands from the target controller. In still further embodiments, after the target controller causes reference Phy configuration information to be generated and the references Phys are created, the target controller can request that the reference Phy configuration information be stored in persistent memory or storage so that it thereafter reappears automatically upon boot. After a reference Phy is created, a broadcast change notification (BCN) is emitted to notify external initiators of the change.

These reference Phys now appear to the SAS network as regular Phys, and can be discovered during initiator discovery and expander self-configuration. To the initiators and expander, it appears that the expander has physical Phys 12-15, when in fact they are just reference Phys. Accordingly, route table 208 according to embodiments of the invention is created by the expander, with additional entries for addresses B-E, each address associated with one or both of Phys 9 and 10. Note that there can be a practical limit to the number of reference Phys that may be created. Currently, SAS expanders can have only 128 Phys total, and with a maximum of 38 physical and virtual Phys, there are only 90 reference Phys available.

The association of a particular SAS address B-E with Phy 9 or 10, or both, can be programmed to give priority to certain devices. For example, in the example of FIG. 2b, addresses B and C are associated with both Phy 9 and 10. When a command is received at the expander for device B or C, the command can be routed to either Phy 9 or 10, whichever is available. This provides B and C with higher bandwidth should B and C be designated as higher priority or higher traffic devices. Devices D and E, on the other hand, are given only a single Phy and are therefore of a lower priority in the example of FIG. 2b.

By referring commands to either a physical Phy or a virtual Phy depending on the destination address of the command, the reference Phy enables a larger number of targets to be accessed through a lesser number of physical or virtual Phy. For example, if an initiator sends an OPEN frame (a command to request the opening of a connection) to expander 200 with a source address of the initiator and a destination address of B in an attempt to open up a connection with device B, the expander will receive the request, use route table 208 to determine that device B is accessible through either Phy 9 or 10, determines which Phy is available, and forward the OPEN request to either Phy 9 or 10. The target controller 204 receives the OPEN frame, determines that the destination address of the request is B, and forwards the request to B.

After the connection has been opened, the initiator may, for example, request data from device B. After the request for data is received, the connection may be closed down while device B retrieves the requested data. When device B is ready to send the data back to the initiator, the target controller 204 can send another OPEN command to the expander (using the source address in the earlier OPEN frame as the new destination address) to open a new connection with the initiator and thereafter send the data back to the initiator.

Figure 3A:
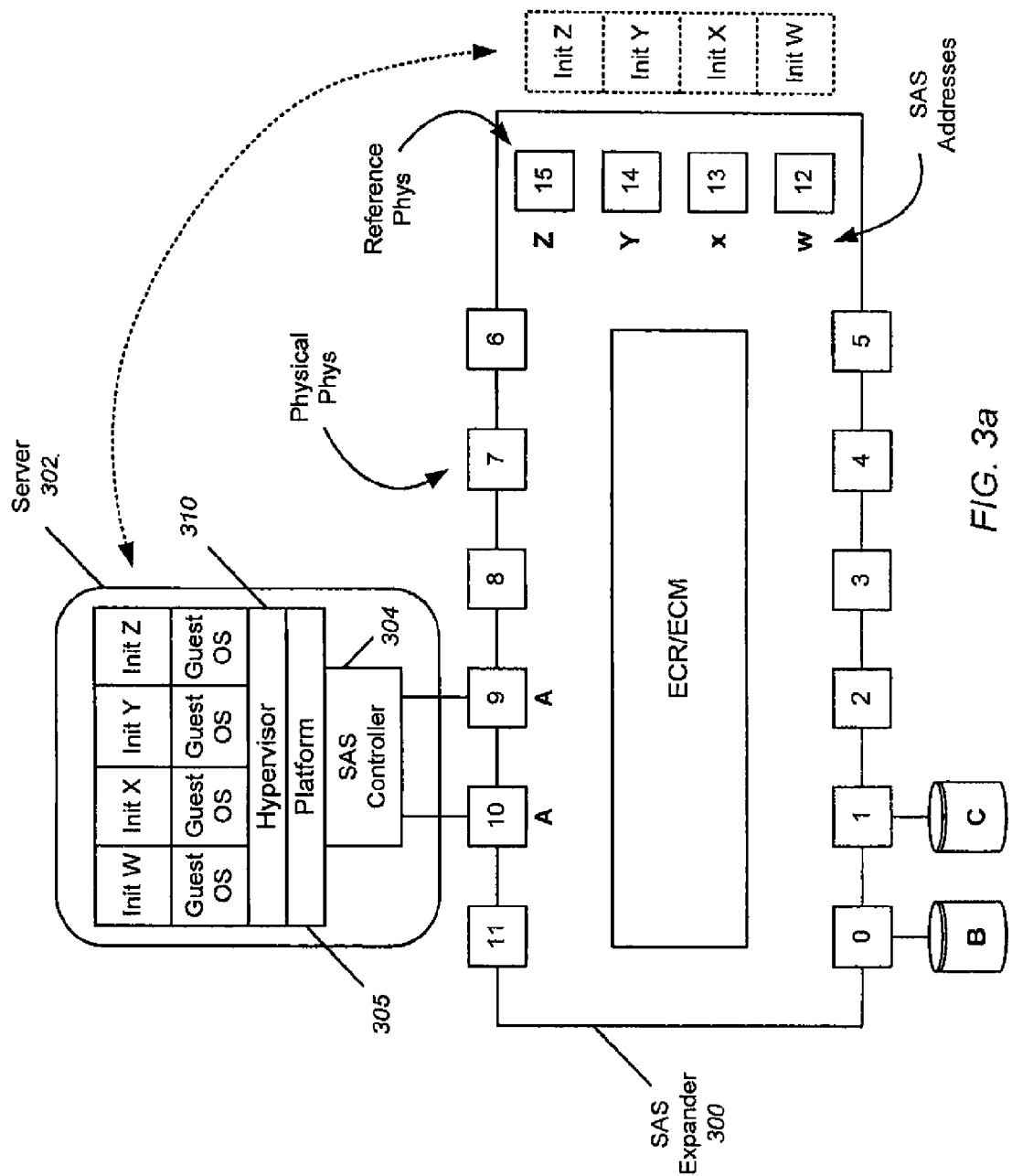
FIG. 3a illustrates an exemplary SAS expander coupled to a server and providing initiator virtualization from a platform perspective according to embodiments of the invention.

FIG. 3a illustrates an exemplary SAS expander 300 coupled to a server 302 and providing initiator virtualization from a platform perspective according to embodiments of the invention. This would be a likely scenario in virtualization environments where multiple host-operating systems share an IOC. In FIG. 3a, SAS expander 300 is coupled to server 302 having a SAS controller 304 and four virtual operating systems (OS) representing four virtual initiators having SAS addresses W, X, Y and Z through Phy 9 and 10. By virtualizing the guest operating systems, each guest OS believes that it has its own SAS controller with a different SAS address. Between SAS controller 304 and virtual or guest OSs is a platform 305 and a hypervisor 310. Hypervisor 310 can be conceptually viewed as an OS for other OSs and can be referred to as a host OS. Phys 9 and 10 together comprise a wide port having a single SAS address A (as a wide-port is defined as two or more phys that have the same address). However, because only one address is normally associated with each Phy or port for legacy systems, server 302 is viewed as being directly attached and having only a single SAS address A available through both Phys 9 and 10. In addition, a device having a SAS address B is directly attached to physical Phy 0, and a device having a SAS address C is directly attached to physical Phy 1.

Figure 3B:
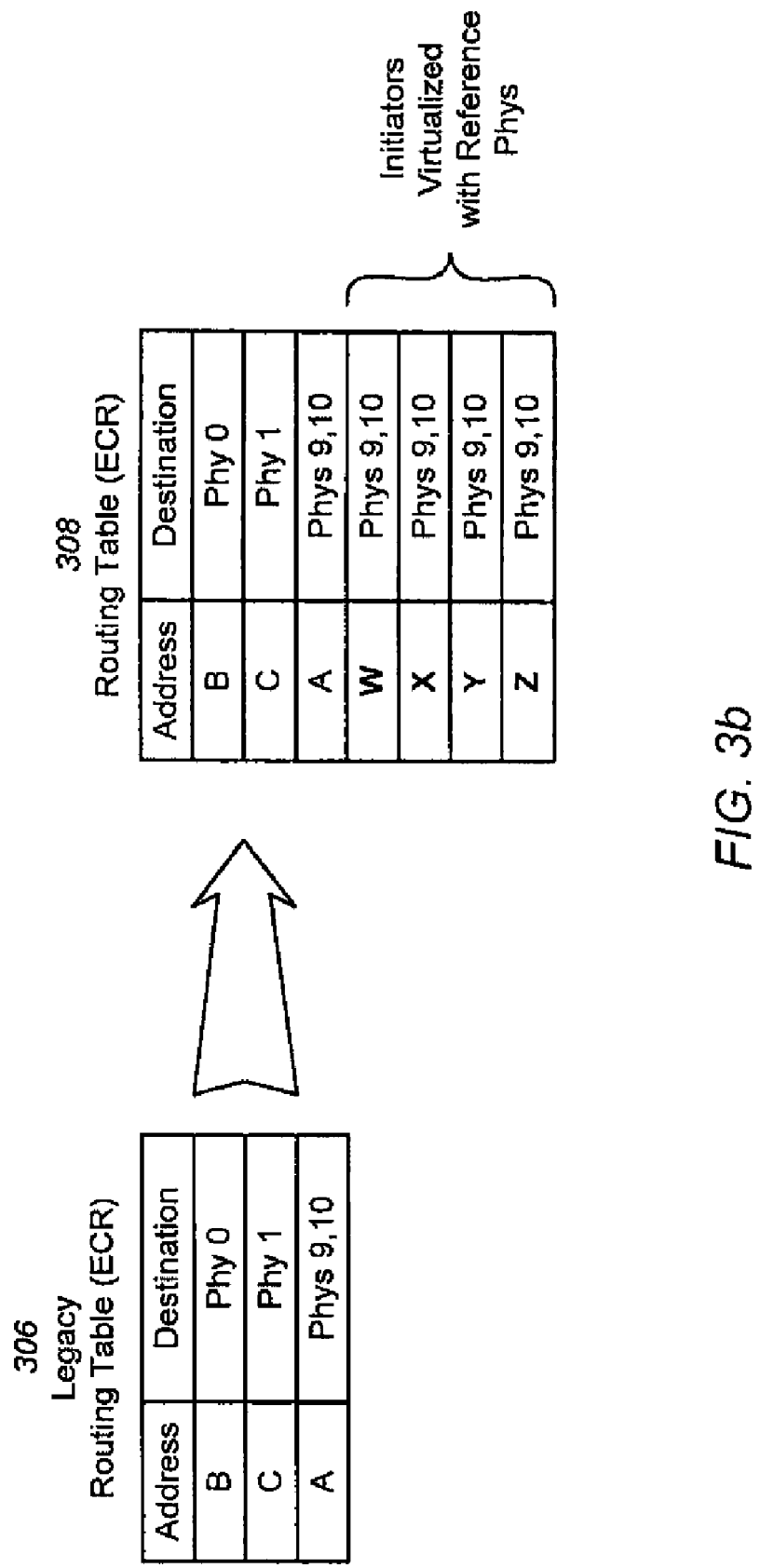
FIG. 3b illustrates exemplary route tables corresponding to the SAS expander of FIG. 3a according to embodiments of the invention.

FIG. 3b illustrates exemplary route tables corresponding to the SAS expander 300 of FIG. 3a according to embodiments of the invention. In FIG. 3b, with the initial configuration described above, a legacy routing table 306 can be created, with address A associated with Phys 9 and 10, address B associated with Phy 0, and address C associated with Phy 1.

However, according to some embodiments of the invention, each time a virtual OS is started by hypervisor 310, the hypervisor allocates a unique SAS address to that virtual OS, and SAS controller 304 sends a series of CONFIG_PHY_INFO commands using SMP to the SAS expander 300, one for each virtual OS W-Z connected to the SAS controller. Each command provides the SAS address of each virtual OS. Because the expander 300 knows the Phy through which the commands are being received (Phy 9 and 10 in the example of FIG. 3a), the expander creates reference Phys 12-15, one for each device having addresses W-Z, each reference Phy associated with Phy 9 and 10. In other embodiments in which the devices attached to the SAS expander are known and stable, the information needed to create the reference Phys can be stored in nonvolatile memory such as flash, and loaded upon startup so that the firmware in the expander can create the reference Phys automatically without the need to receive commands from the SAS controller. In still further embodiments, after the SAS controller causes reference Phy configuration information to be generated and the references Phys are created, the SAS controller can request that the reference Phy configuration information be stored in persistent memory or storage so that it thereafter reappears automatically upon boot. After a reference Phy is created, a broadcast change notification (BCN) is emitted to notify external initiators of the change.

The reference Phys 12-15 now appear to the SAS network as regular Phys, and can be discovered during initiator discovery and expander self-configuration. Accordingly, route table 308 according to embodiments of the invention is created, with additional entries for addresses W-Z, each address associated with one or both of Phys 9 and 10. The association of a particular SAS address W-Z with Phy 9 or 10, or both, can be programmed to give priority to certain devices. In the example of FIG. 3b, addresses W-Z are associated with both Phy 9 and 10. When a request is received at the expander for one of W through Z, the request can be routed to either Phy 9 or 10, whichever is available. This provides W-Z with higher bandwidth should W through Z be designated as higher priority or higher traffic devices. Devices B and C, on the other hand, are given only a single Phy and are therefore of a lower priority in the example of FIG. 3b.

By referring requests to either a physical Phy or a virtual Phy depending on the destination address of the request, the reference Phy enables a larger number of virtual initiators to be accessed through a lesser number of physical or virtual Phy. For example, if a target sends an OPEN frame to expander 300 with a destination address of W in an attempt to open up a connection with virtual initiator W, the expander will receive the request, use route table 308 to determine that virtual initiator W is accessible through either Phy 9 or 10, determine which Phy is available, and forward the request to either Phy 9 or 10. The SAS controller 304 receives the OPEN frame, determines that the destination address of the command is virtual initiator W, and forwards the request to W.

If the connection between the target and the virtual initiator W is subsequently closed, virtual initiator W may later request that a new connection between the virtual initiator W and the target be opened. In this case, virtual initiator W can send an OPEN frame to the target to open a new connection with the target. This is advantageous, because previously the SAS controller had to keep track of what command each initiator sent out in order to determine where to route an incoming response (which guest OS should receive the particular response).

Figure 4:
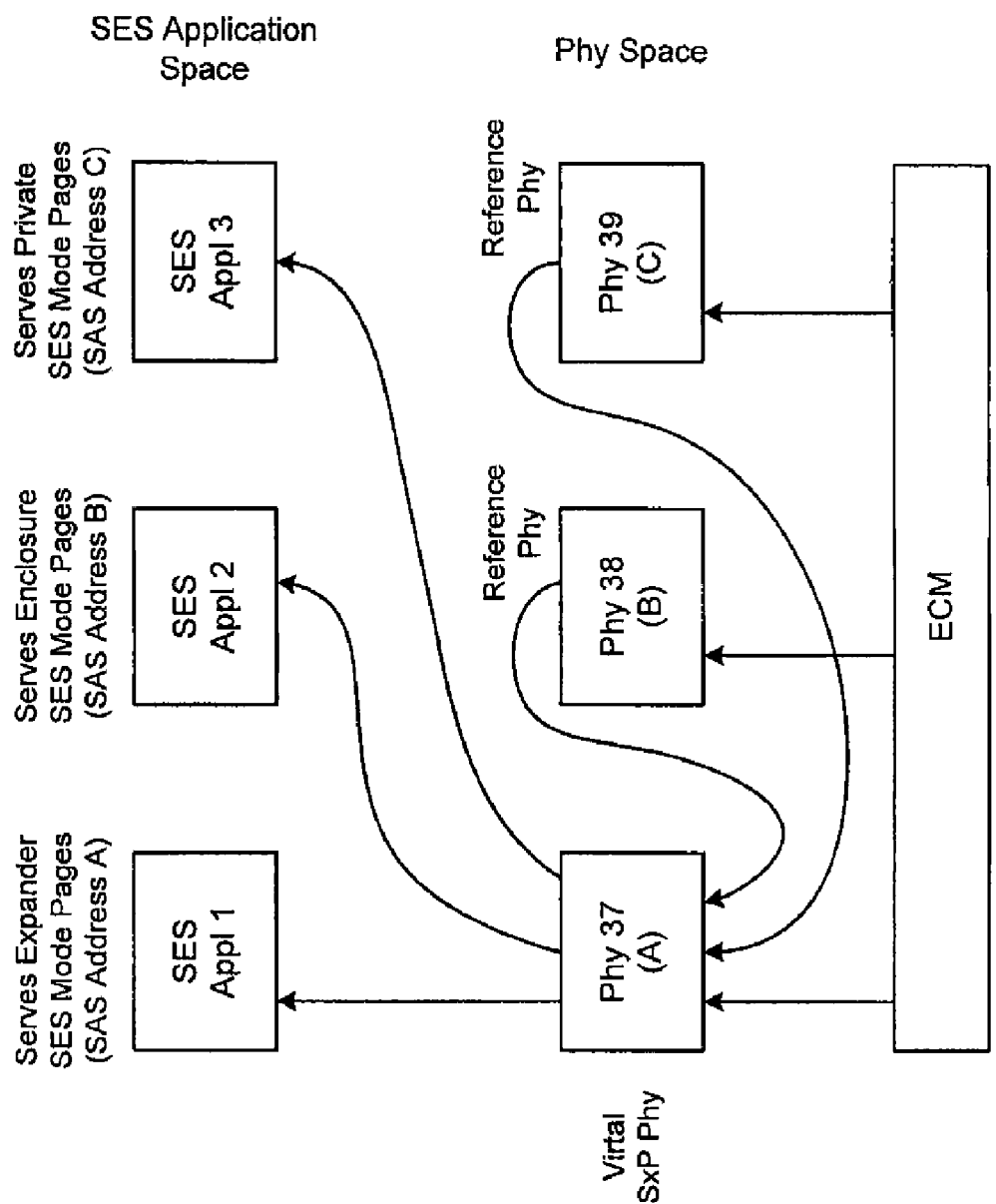
FIG. 4 illustrates an exemplary virtualization of virtual Phys for providing multiple SCSI Enclosure Services (SES) applications behind a single virtual Phy according to embodiments of the invention.

FIG. 4 illustrates an exemplary virtualization of virtual Phys for providing multiple SCSI Enclosure Services (SES) applications behind a single virtual Phy according to embodiments of the invention. SES applications are accessible through a virtual Phy, run within the expander, and control environmental aspects of the expander, such as turning a fan on or off. SES applications may also be capable of sending data about environmental conditions in the form of SCSI mode pages back to a requesting device such as an initiator. Alternatively, an initiator can send commands to update the firmware for a SES application. In FIG. 4, three SES applications having addresses A-C are running behind virtual Phy 37 having a single SAS address A. Virtual Phy 37 already exists to route requests to SES application 1. Two reference Phys 38 and 39 having addresses are created and added to a routing table, so that commands such as OPEN frames directed to addresses B and C from the expander connection manager (ECM) are referred to Phy 37 through the reference Phys.

Note that reference Phys can be created to refer to both physical Phys and virtual Phys at the same time (though a reference Phy refers to a single Phy or wide-port).

Embodiments of the invention can reside entirely within an expander with no knowledge in the target of SAS controller as long as the reference Phys can be created from information in flash and a connected controller is able to pass OPEN frames including source and destination addresses for either responding to the OPEN frame or generating a new OPEN frame.

Figure 5:
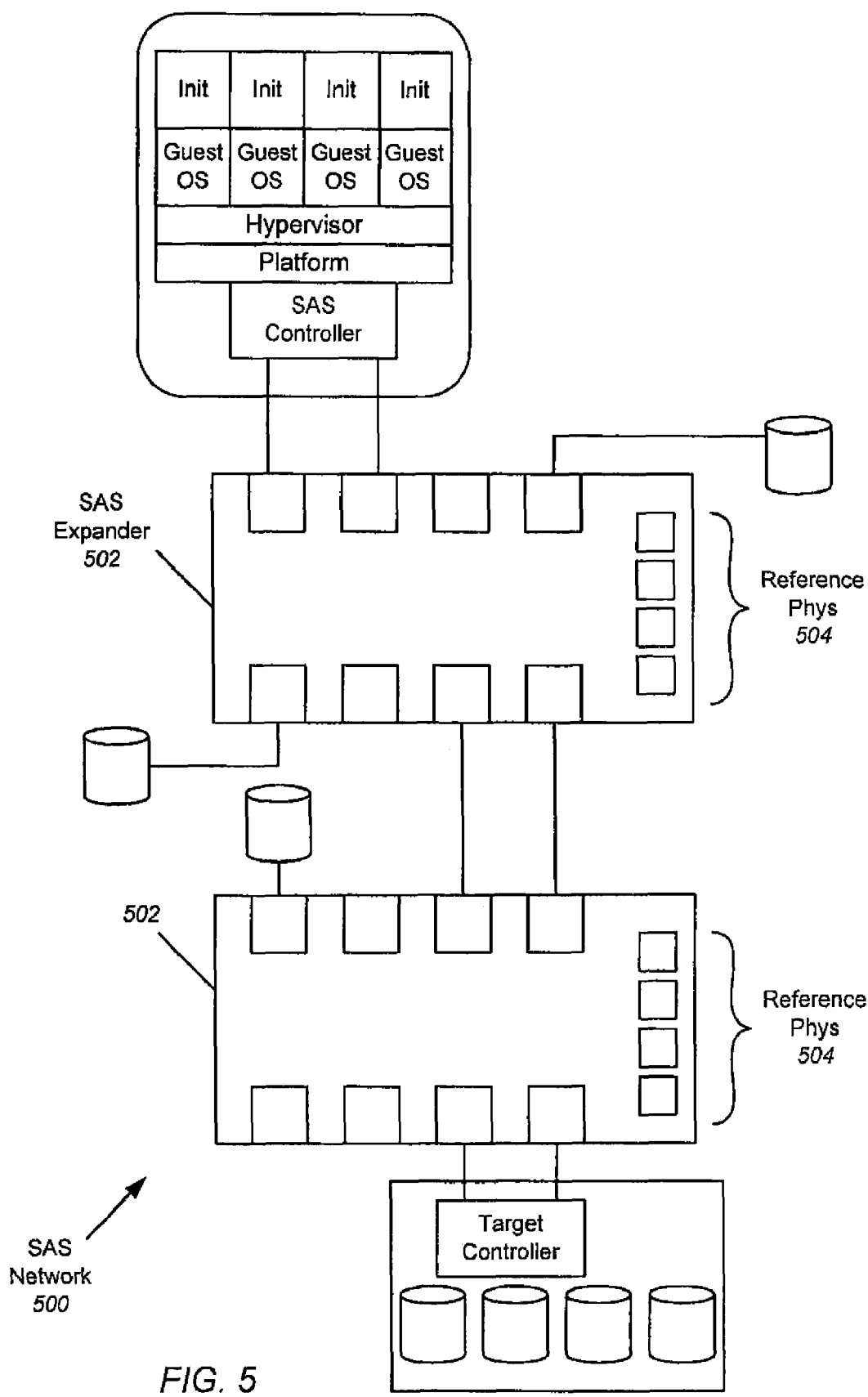
FIG. 5 illustrates an exemplary SAS network including multiple SAS expanders, one or more of which provide reference Phys for virtualization according to embodiments of the invention.

FIG. 5 illustrates an exemplary SAS network 500 including multiple SAS expanders 502, one or more of which provide reference Phys 504 for virtualization according to embodiments of the invention.

Figure 6:
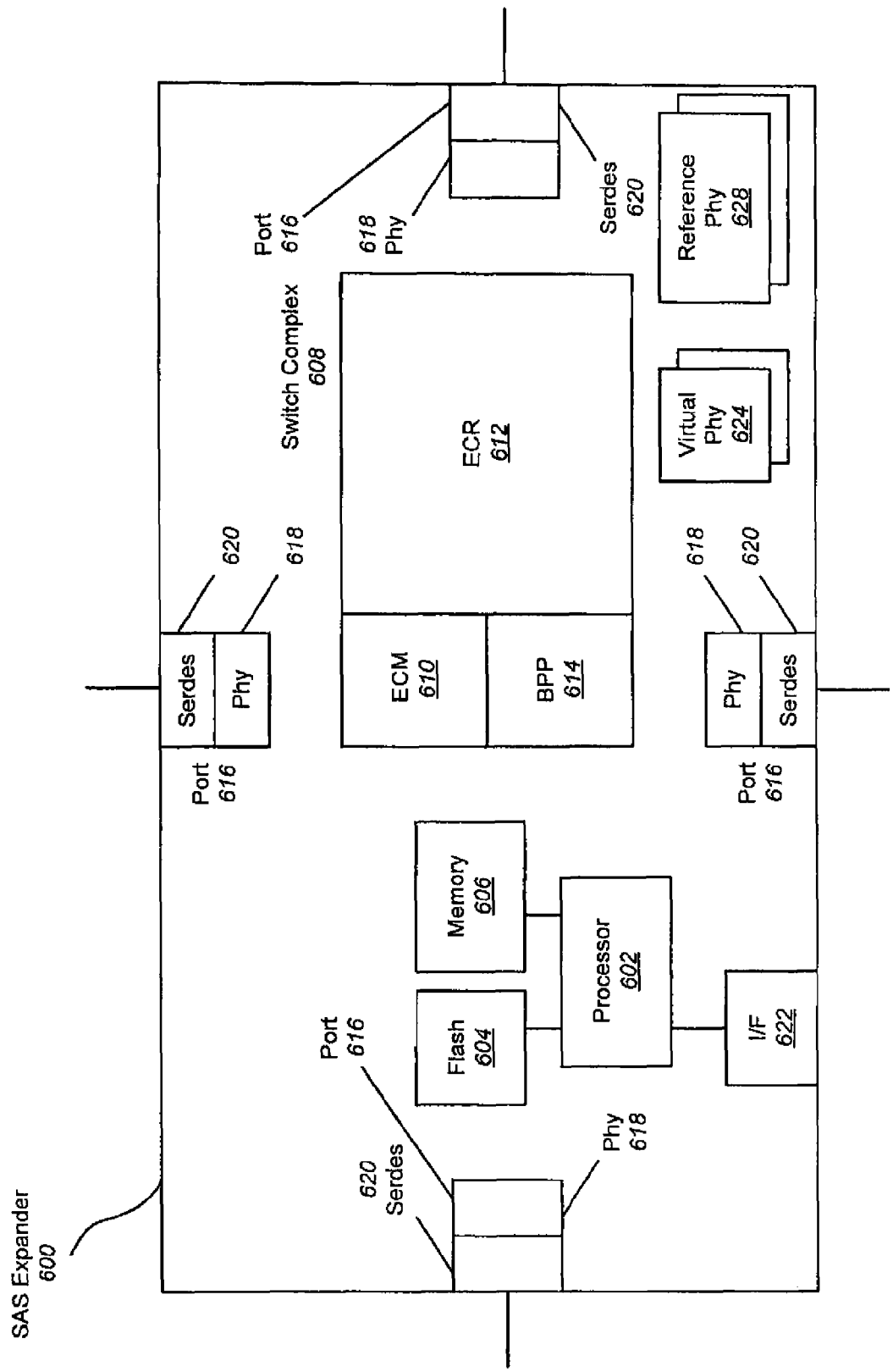
FIG. 6 illustrates an exemplary SAS expander 600 employing reference Phys for SAS virtualization according to embodiments of the invention.

FIG. 6 illustrates an exemplary SAS expander 600 employing reference Phys for SAS virtualization according to embodiments of the invention. In FIG. 6, SAS expander 600 is shown with processor 602, flash 604, memory 606, and switch complex 608 including an expander connection manager (ECM) 610, expander connection router (ECR) 612, and broadcast primitive processor (BPP) 614. ECM 610 allows pathways to be built between two Phy. ECR 612 can include a crossbar switch, and makes and implements decisions regarding routing connections between Phy. BPP 614 propagates BCNs to all other ports in the SAS expander except the port that caused the BCN to be generated. SAS expander 600 also includes a plurality of ports 616, each including a physical Phy 618 and a serializer/deserializer (Serdes) 620, and an interface 622 for external out-of-band communications such as configuration commands from an administrator. In addition, SAS expander 600 includes one or more virtual Phy 624, and one or more reference Phy 628 as created and described above. It should be understood that although the exemplary SAS expander of FIG. 6 shows four ports for simplicity, in other embodiments many more ports may be present.

Firmware residing in memory 606 or flash 604, which are forms of computer-readable media, can be executed by processor 604 to perform the operations described above with regard to reference Phys and their associated commands. Furthermore, memory 606 or flash 604 can store the configuration information, routing tables, and port attributes described above.

Note that this firmware can be stored and transported on any computer-readable medium for use by or in connection with an instruction execution system, apparatus, or device, such as a computer-based system, processor-containing system, or other system that can fetch the instructions from the instruction execution system, apparatus, or device and execute the instructions. In the context of this document, a "computer-readable medium" can be any medium that can contain, store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples of the computer-readable medium include, but are not limited to, an electrical connection (electronic) having one or more wires, a portable computer diskette (magnetic), a random access memory (RAM) (magnetic), a read-only memory (ROM) (magnetic), an erasable programmable read-only memory (EPROM) (magnetic), an optical fiber (optical), portable optical disc such a CD, CD-R, CD-RW, DVD, DVD-R, or DVD-RW, or flash memory such as compact flash cards, secured digital cards, USB memory devices, a memory stick, and the like. Note that the computer-readable medium could even be paper or another suitable medium upon which the program is printed, as the program text can be electronically captured via optical scanning of the paper or other medium, then compiled, interpreted or otherwise processed in a suitable manner if necessary, and then stored in a computer memory.

Although the present invention has been fully described in connection with embodiments thereof with reference to the accompanying drawings, it is to be noted that various changes and modifications will become apparent to those skilled in the art. Such changes and modifications are to be understood as being included within the scope of the present invention as defined by the appended claims.

What is claimed is:

1. A method for enabling virtualization in a Serial Attached SCSI (SAS) expander including a plurality of Phys, wherein the plurality of Phys comprise a set of one or more physical or virtual Phy corresponding to a single SAS address, the method comprising:

creating a reference Phy for each SAS address of multiple SAS addresses to be virtualized in the expander, wherein the reference Phys enable access from the multiple SAS addresses to the expander through at least one Phy of said set of one or more physical or virtual Phy;

adding entries for the multiple SAS addresses in a route table, each entry associating one of the multiple SAS addresses with at least one Phy of said set of one or more physical or virtual Phy, the route table including at least an entry associating the single SAS address to said set of one or more physical or virtual Phy; and routing a request with a destination address being one of the multiple SAS addresses to at least one Phy of said set of one or more physical or virtual Phy in accordance with the route table, said request received at said destination address via said set of one or more physical or virtual Phy.

2. The method of claim 1, further comprising receiving a command from a device external to the SAS expander to create each reference Phy.

3. The method of claim 2, further comprising receiving the command from a target controller external to the SAS expander.

4. The method of claim 2, further comprising receiving the command from a SAS controller in a server external to the SAS expander.

5. The method of claim 2, further comprising:
after creating each reference Phy, persistently storing reference Phy information needed to create each reference Phy.

6. The method of claim 1, further comprising creating the reference Phys during initialization of the SAS expander.

7. The method of claim 1, further comprising performing initiator discovery after creation of the reference Phys, and generating requests for the virtualized SAS addresses after performing initiator discovery.

8. The method of claim 1, further comprising emitting a broadcast change notification (BCN) to notify external initiators of a change after a reference Phy is created.

9. The method of claim 1, further comprising generating the route table during expander self-configuration.

10. The method of claim 1, further comprising increasing a priority of devices associated with particular SAS addresses being virtualized by associating, in the route table, a plurality of physical or virtual Phys with the particular SAS addresses being virtualized.

11. The method of claim 1, wherein one or more of the SAS addresses being virtualized are associated with SAS or SATA drives.

12. The method of claim 1, wherein one or more of the SAS addresses being virtualized are associated with virtual initiators.

13. The method of claim 1, wherein one or more of the SAS addresses being virtualized behind a virtual Phy are associated with SCSI enclosure services (SES) applications.

14. A Serial Attached SCSI (SAS) expander capable of supporting virtualization, the SAS expander including a plurality of Phys, wherein the plurality of Phys comprise a set of one or more physical or virtual Phy corresponding to a single SAS address, the SAS expander comprising a processor programmed for:

creating a reference Phy for each SAS address of multiple SAS addresses to be virtualized in the expander, wherein the reference Phys enable access from the multiple SAS addresses to the expander through at least one Phy of said set of one or more physical or virtual Phy;

adding entries for the multiple SAS addresses in a route table, each entry associating one of the multiple SAS addresses with at least one Phy of said set of one or more physical or virtual Phy, the route table including at least an entry associating the single SAS address to said set of one or more physical or virtual Phy;

sending a broadcast change notification (BCN) once the reference Phy is created, and routing a request with a destination address being one of the multiple SAS addresses to at least one Phy of said set of one or more physical or virtual Phy in accordance with the route table, said request received at said destination address via said set of one or more physical or virtual Phy.

15. The SAS expander of claim 14, the processor further programmed for creating the reference Phys during initialization of the SAS expander.

16. The SAS expander of claim 14, the processor further programmed for generating the route table during expander self-configuration.

17. The SAS expander of claim 14, the processor further programmed for increasing a priority of devices associated with particular SAS addresses being virtualized by associating, in the route table, a plurality of physical or virtual Phys with the particular SAS addresses being virtualized.

18. A SAS expander network of interconnected SAS expanders, one or more of the SAS expanders comprising the SAS expander of claim 14.

19. A storage area network comprising the SAS expander network of claim 18.

20. A computer-readable storage medium comprising program code for enabling virtualization in a Serial Attached SCSI (SAS) expander, the SAS expander including a plurality of Phys, wherein the plurality of Phys comprise a set of one or more physical or virtual Phy corresponding to a single SAS address, the program code for causing performance of a method comprising:
creating a reference Phy for each SAS address of multiple SAS addresses to be virtualized in the expander, wherein the reference Phys enable access from the multiple SAS addresses to the expander through at least one Phy of said set of one or more physical or virtual Phy;
adding entries for the multiple SAS addresses in a route table, each entry associating one of the multiple SAS addresses with at least one Phy of said set of one or more physical or virtual Phy, the route table including at least an entry associating the single SAS address to said set of one or more physical or virtual Phy;
sending a broadcast change notification (BCN) once the reference Phy is created, and
routing a request with a destination address being one of the multiple SAS addresses to at least one Phy of said set of one or more physical or virtual Phy in accordance with the route table, said request received at said destination address via said set of one or more physical or virtual Phy.

21. The computer-readable storage medium of claim 20, the program code further for causing performance of a method comprising creating the reference Phys during initialization of the SAS expander.

22. The computer-readable storage medium of claim 20, the program code further for causing performance of a method comprising generating the route table during expander self-configuration.

23. The computer-readable storage medium of claim 20, the program code further for causing performance of a method comprising increasing a priority of devices associated with particular SAS addresses being virtualized by associating, in the route table, a plurality of physical or virtual Phys with the particular SAS addresses being virtualized.

24. A method performed in an external device for enabling virtualization in a Serial Attached SCSI (SAS) expander, the SAS expander including a plurality of Phys, wherein the plurality of Phys comprise a set of one or more physical or virtual Phy corresponding to a single SAS address, the method comprising:
for each SAS address associated with the external device, sending a command to the SAS expander to create a reference Phy in the expander,
wherein, in response to the commands, the expander creates the reference Phy for each SAS address associated with the external device so that multiple SAS addresses are to be virtualized in the expander, wherein the reference Phys enable access from the multiple SAS addresses to the expander through at least one Phy of said set of one or more physical or virtual Phy in the SAS expander;
wherein the expander adds entries for the multiple SAS addresses in a route table, each entry associating one of the multiple SAS addresses with at least one Phy of said set of one or more physical or virtual Phy, the route table including at least an entry associating the single SAS address to said set of one or more physical or virtual Phy; and
wherein the expander routes a request with a destination address being one of the multiple SAS addresses to at least one Phy of said set of one or more physical or virtual Phy in accordance with the route table, said request received at said destination address via said set of one or more physical or virtual Phy.

25. The method of claim 24, wherein the external device is a target controller.

26. The method of claim 24, wherein the external device is a SAS controller.

27. The method of claim 24, further comprising performing discovery after sending the command to create the reference Phys.

28. A device for enabling virtualization in a Serial Attached SCSI (SAS) expander, the SAS expander including a plurality of Phys, wherein the plurality of Phys comprise a set of one or more physical or virtual Phy corresponding to a single SAS address, the device comprising a processor programmed for:
for each SAS address associated with the device, sending a command to the SAS expander to create a reference Phy in the expander,
wherein, in response to the commands, the expander creates the reference Phy for each SAS address associated with the device so that multiple SAS addresses are to be virtualized in the expander, wherein the reference Phys enable access from the multiple SAS addresses to the expander through at least one Phy of said set of one or more physical or virtual Phy in the SAS expander;
wherein the expander adds entries for the multiple SAS addresses in a route table, each entry associating one of the multiple SAS addresses with at least one Phy of said set of one or more physical or virtual Phy, the route table including at least an entry associating the single SAS address to said set of one or more physical or virtual Phy; and
wherein the expander routes a request with a destination address being one of the multiple SAS addresses to at least one Phy of said set of one or more physical or virtual Phy in accordance with the route table, said request received at said destination address via said set of one or more physical or virtual Phy.

29. The device of claim 28, wherein the device is a target controller.

30. The device of claim 28, wherein the device is a SAS controller.

31. The device of claim 28, the processor further programmed for performing discovery after sending the command to create the reference Phys.

* * * * *